United States Patent [19]

Lelong

[11] Patent Number: 4,603,256
[45] Date of Patent: Jul. 29, 1986

[54] SCINTILLATION RADIATION MEASURING DEVICE COMPRISING A PHOTOMULTIPLIER TUBE, AND SCINTILLATION CAMERA COMPRISING SUCH A DEVICE

[75] Inventor: Pierre H. Lelong, Paris, France

[73] Assignee: U.S. Philips Corporation, New York, N.Y.

[21] Appl. No.: 579,735

[22] Filed: Feb. 13, 1984

[30] Foreign Application Priority Data

Feb. 14, 1983 [FR] France .................................. 83 02324

[51] Int. Cl.⁴ ...................... G01T 1/208; G01T 1/164; G01T 1/20
[52] U.S. Cl. ............................. 250/361 R; 250/363 S; 250/369
[58] Field of Search ................ 250/369, 361 R, 363 S; 377/10; 328/129.1

[56] References Cited

U.S. PATENT DOCUMENTS 3,541,311 11/1970 Taylor ..................................... 377/10
4,186,307 1/1980 Tanaka et al. .................... 250/363 S Primary Examiner—Alfred E. Smith
Assistant Examiner—Constantine Hannaher
Attorney, Agent, or Firm—Paul R. Miller

[57] ABSTRACT

A radiation measuring device comprises a scintillator for detection of radiation, a photomultiplier tube and an amplifier circuit for supplying signals having amplitudes dependent on the output current of the photodetector. A first series circuit of a sampling and digital-to-analog converter circuit and an adder is provided with a first storage register connected to the adder. A second storage register is connected to the output of the adder, and the output of the second storage register provides the output of the measuring device. A second series circuit is connected to the output of the photodetector or the amplifier circuit, and includes a pulse start detector, a clock pulse generator, a clock pulse counter, and a comparison circuit. The output of the comparison circuit is connected to the second storage register for storing a sum signal which is supplied by the adder, as well as the first storage register, in order to reset the first storage register to zero.

4 Claims, 1 Drawing Figure

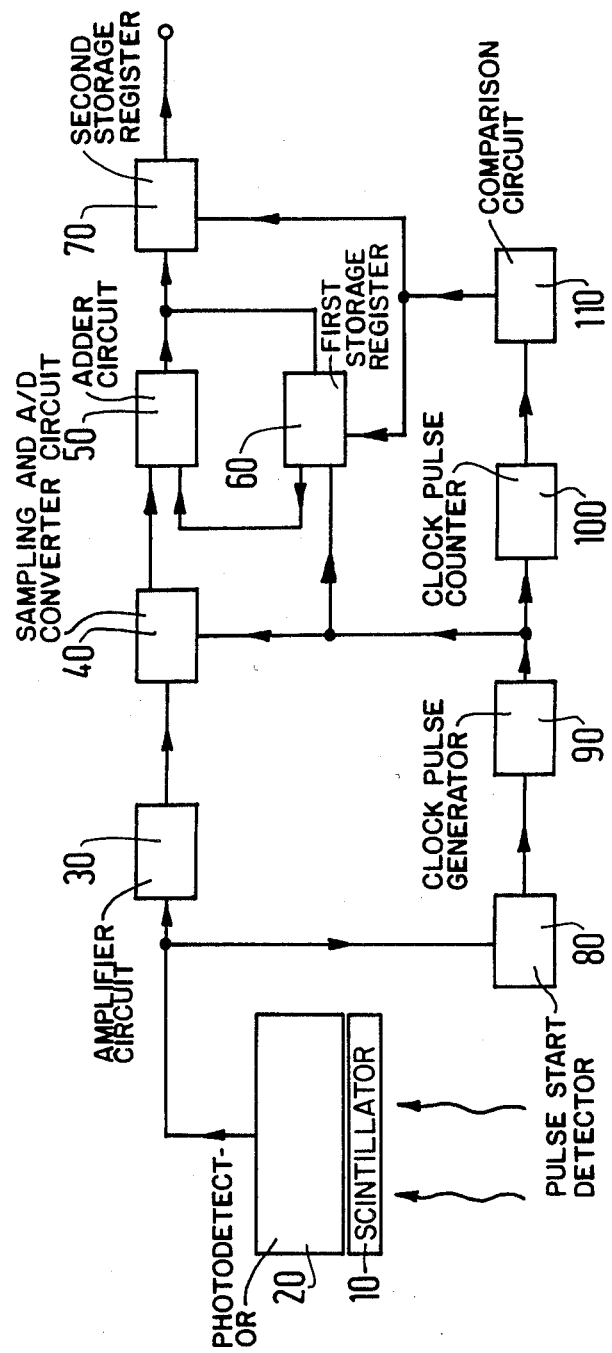

SCINTILLATION RADIATION MEASURING DEVICE COMPRISING A PHOTOMULTIPLIER TUBE, AND SCINTILLATION CAMERA COMPRISING SUCH A DEVICE

The invention relates to a scintillation radiation measuring device comprising a photomultiplier tube, and to a scintillation camera comprising such a device.

U.S. Pat. No. 4,186,307 discloses a scintillation measuring apparatus which mainly comprises: a scintillator for detection of radiation which is optically coupled to the entrance window of a photodetector, for example a photomultiplier tube, in order to convert the radiation into an electric current, a current amplifier for supplying signals which are proportional to the intensity of this current, a pulse shaping circuit, a delay line, an integrator, and a sampling circuit at the output of this integrator. Also connected to the current amplifier is a current detection circuit for control of a flipflop which itself controls a logic circuit for supplying the control signals to the integrator and the sampling circuit in accordance with the duration of intervals between the signals supplied by the current amplifier.

Using apparatus of this kind it is impossible to measure a new radiation quantum before the charge built up in the integrator by the preceding quantum has been reduced to zero again, so that the maximum processing speed of the apparatus is limited.

It is the object of the invention to provide a radiation measuring device in which the waiting period required between two measurements for setting the integrator network to zero is drastically reduced, so that the processing speed of the apparatus is increased.

To this end, a radiation measuring device in accordance with the invention, comprising a scintillator for the detection of radiation optically coupled to an entrance window of a photodetector, preferably a photomultiplier tube, and an amplifier circuit for supplying signals proportional to the output current of the photodetector, is characterized in that to the output of the amplifier circuit there is connected a series connection of a sampling and analog-to-digital converter circuit and an adder with the output of the adder being connected to a first storage register having an output fed back to a second input of the adder, a second storage register being connected to the output of the adder with the output of the second storage register forming the output of the measuring device, and a series connection of a pulse start detector, a clock pulse generator, a clock pulse counter and a comparison circuit being connected to the output of the photodetector or the amplifier circuit. The output of the comparison circuit is connected to the second register for storage of a sum signal supplied by the adder as well as to a control input of the first register in order to reset this register to zero. The output of the clock pulse generator is connected to the sampling and analog-to-digital converter circuit as well as to the first storage register in order to store a sum signal formed by the adder after each clock pulse.

The invention will be described in detail hereinafter with reference to the drawing which shows, by way of example, an embodiment of a radiation measuring device in accordance with the invention.

The radiation measuring device as shown in the figure first comprises a scintillator 10 for detection of radiation for which energy and intensity measurements are to be performed. The scintillator 10 converts every photon intercepted into a scintillation and is optically coupled to the entrance window of a photodetector, for example a photomultiplier tube 20. This tube converts every scintillation into a current which is converted by an amplifier circuit 30 into a signal whose amplitude is determined by the output current of the photomultipler tube 20, and hence, by the intensity of the scintillation. The circuit 30 furthermore performs a light filtering operation in order to smooth the signal. A series connection of a sampling and analog-to-digital converter circuit 40 and an adder 50 is connected to the circuit 30. A first storage register 60 is connected to the output of the adder 50, the output of the storage register 60 being fed back to a second input of the adder 50. A second storage register 70 is coupled to the output of the adder 50, the output of which supplies a signal only in given circumstances as will be explained hereinafter.

The described circuit performs, by addition and cumulative storage in the register 60 as the signals arrive, a progressive determination of the energy delivered by each radiation (photon) under the control of a clock pulse generator 90 which is started by a pulse start detector 80, such as for example a threshold voltage detector. The clock pulse generator 90 generates periodic signals which are applied to the circuit 40, the register 60 and the clock pulse counter 100. The count of the clock pulse counter 100 is applied to a comparison circuit 110 whose output is applied to a control input of the second register 70 in order to enable an output when the appropriate number of samples is reached. The output signal of the comparison circuit 110 is also applied to the first register 60 in order to reset this register to zero at the end of the measurement when the number of samples is reached.

Consequently, the device in accordance with the invention does not involve the long waiting periods between two measurements which are customary of prior art devices. The register 60 is reset to zero by means of a control pulse which is generated by the comparison circuit 110, so that the waiting period between two measurements is reduced to the pulse period of the clock pulse generator 90 which is a factor of 10, 100, or even more shorter than the waiting period between two measurements in prior art devices.

Evidently, the present invention is not restricted to the described embodiment. Within the scope of the invention various alternatives exist which will be obvious to those skilled in the art.

For example, the pulse start detector 80 could alternatively be connected to a different point, for example to the output of the circuit 30. Similarly, the operating principle of the measuring device is not affected when instead of linear conversion a nonlinear conversion is used for a dynamics increase. Finally, the invention can be used in any apparatus comprising one or more radiation detectors utilizing this device, notably single detectors of the gamma probe type and scintillation cameras.

What is claimed is:

1. A radiation measuring device comprising
scintillator means for detecting radiation,
photodetector means optically coupled to said scintillator means for providing electrical output current,
amplifier circuit means receiving said output current for supplying signals having an amplitude dependent on said output current of said photodetector means,
a first series circuit connected to an output of said amplifier circuit means, said first series circuit including a sampling and analog-to-digital converter circuit and an adder circuit, a first storage register circuit means receiving an output from said adder circuit for providing output signals to said adder circuit, a second storage register circuit means receiving said output from said adder circuit for providing an output of the measuring device, and a second series circuit connected to an output of one of said photodetector means or said amplifier circuit means for providing signals to said first and second storage register circuit means, said second series circuit including a pulse start detection circuit, a clock pulse generator circuit, a clock pulse counter circuit, and a comparison circuit, said clock pulse generator circuit being connected to said sampling and analog-to-digital converter circuit and to said first storage register circuit means for storing a sum signal formed after each clock pulse by said adder circuit, said comparison circuit providing signals to said second storage register circuit means for storing said sum signal supplied by said adder circuit, and said comparison circuit providing signals to a control input of said first storage register circuit means to reset said first storage register circuit means to zero.

2. A radiation measuring device according to claim 1, wherein said second series circuit is connected to said photodetector means.

3. A gamma camera comprising at least one radiation measuring device which includes scintillator means for detecting radiation, photodetector means optically coupled to said scintillator means for providing electrical output current amplifier circuit means receiving said output current for supplying signals having an amplitude dependent on said output current of said photodetector means, a first series circuit connected to an output of said amplifier circuit means, said first series circuit including a sampling and analog-to-digital converter circuit and an adder circuit, a first storage register circuit means receiving an output from said adder circuit for providing input signals to said adder circuit, a second storage register circuit means receiving said output from said adder circuit for providing an output of said radiation measuring device, and a second series circuit connected to an output of one of said photodetector means or said amplifier circuit means for providing signals to said first and second storage register circuit means, said second series circuit including a pulse start detector circuit, a clock pulse generator circuit, a clock pulse counter circuit, and a comparison circuit, said clock pulse generator circuit being connected to said sampling and analog-to-digital converter circuit and to said first storage register circuit means for storing a sum signal formed after each clock pulse by said adder circuit, said comparison circuit providing signals to said second storage register circuit means for storing said sum signal supplied by said adder circuit, and said comparison circuit providing signals to a control input of said first storage register circuit means to reset said first storage register circuit means to zero.

4. A gamma camera according to claim 3, wherein said second series circuit is connected to said photodetector means.

* * * * *